United States Patent
Millerman

(10) Patent No.: US 7,146,724 B2
(45) Date of Patent: Dec. 12, 2006

(54) METHOD OF ASSEMBLING AN INTERNAL COMBUSTION ENGINE

(75) Inventor: Alexander Millerman, Bloomfield Hills, MI (US)

(73) Assignee: General Motors Corporation, Detroit, MI (US)

( * ) Notice: Subject to any disclaimer, the term of this patent is extended or adjusted under 35 U.S.C. 154(b) by 503 days.

(21) Appl. No.: 10/768,541

(22) Filed: Jan. 30, 2004

(65) Prior Publication Data
US 2005/0166395 A1   Aug. 4, 2005

(51) Int. Cl.
*B23P 15/10* (2006.01)
*B23P 19/04* (2006.01)

(52) U.S. Cl. .................. 29/888.01; 29/222; 29/888.07; 29/235; 29/269; 29/451; 29/224

(58) Field of Classification Search ............. 29/888.01, 29/888.07, 888.071, 888.073, 222, 223, 224, 29/235, 451; 123/195 R, 197.4, 195 C, 195 S, 123/195 H
See application file for complete search history.

(56) References Cited

U.S. PATENT DOCUMENTS

| 6,543,405 | B1 |   | 4/2003 | Sachdev et al. |
| 6,687,993 | B1 | * | 2/2004 | Bertin et al. ............ 29/888.044 |
| 6,945,214 | B1 | * | 9/2005 | Sachdev et al. ........ 123/195 R |

\* cited by examiner

*Primary Examiner*—David P. Bryant
*Assistant Examiner*—Sarang Afzali
(74) *Attorney, Agent, or Firm*—Kathryn A. Marra

(57) ABSTRACT

This invention provides a method of assembling a modular internal combustion engine. The modular engine includes a cast crankcase having an open top and a closed bottom, a mid-plate, and an extruded cylinder bore block. A pre-assembled crankshaft with bearings, connecting rods, and pistons with piston rings are all placed through the open top crankcase. The mid-plate partially houses the assembled components over top the crankcase as the connecting rods and pistons extend through and above. Next, the piston rings are simultaneously compressed and the cylinder block is located over the pistons. The pistons with piston rings are inserted into cylinder bores through the bottom surface of the cylinder block and the assembly is completed. This method is performed with the help of a fixture for compressing and positioning the piston rings.

9 Claims, 3 Drawing Sheets

METHOD OF ASSEMBLING AN INTERNAL COMBUSTION ENGINE

TECHNICAL FIELD

This invention relates to a method of assembling a reciprocating internal combustion engine of modular architecture. More specifically, this invention pertains to a method of assembling a crankshaft, carrying connecting rods and pistons with rings, between an open top crankcase and an extruded cylinder bore block.

BACKGROUND OF THE INVENTION

U.S. Pat. No. 6,543,405 issued Apr. 8, 2003 to Sachdev et al. (the '405 patent) describes a modular automotive engine architecture that enables different cylinder blocks to be combined with a common crank case design. The '405 patent is hereby incorporated in full by reference for its description of the engine.

The '405 patent discloses an engine that includes a cast crankcase and an extruded cylinder bore block that are separated by a mid-plate. The cast crankcase has a closed bottom with an open top adjacent the bottom of the cylinder block. The crankcase contains a crankshaft and attached connecting rods. The rods with their attached pistons extend into the bores of the cylinder block. The mid-plate closes the crankcase top except for holes accommodating the motion of the connecting rods and for drainage of lubrication oil from the block to the crankcase. The unique architecture allows different cylinder bore blocks with different displacements to be paired with a common crankcase design. But this new engine architecture presents a challenge in assembly of the crankshaft, connecting rods and pistons with piston rings in the crankcase and cylinder block as they are brought together.

Thus, it is an object of the present invention to provide a method for assembling such a modular automotive engine.

SUMMARY OF THE INVENTION

This invention provides a method of assembling a reciprocating piston internal combustion engine of the type described in the '405 patent.

The open top of the crankcase permits placement of the crankshaft through that opening onto preformed lower bearing supports for the journals of the shaft. Also, the open crankcase top permits pre-assembly of the connecting rods and pistons to the crankshaft before it is placed in the crankcase. Such an assembly operation can be performed at a location and using such equipment and tools as best facilitates the attachment of the connecting rods to the respective throws of the crankshaft. And the placement of piston rings on pistons and the attachment of the pistons to the connecting rods may also be part of such pre-assembly operation before the crankshaft is placed in the suitably supported, upright crankcase. Upper bearing caps, if employed, are placed over the journal portions of the crankshaft to secure it for rotation in the crankcase.

At this stage the connecting rods and pistons, which are connected for rotation to and with the crankshaft, are raised upright and supported for placement of the mid-plate. It may be preferred to rotate or locate the crankshaft so that each piston head extends to about the same height above the top of the crankcase. As the mid-plate is lowered to the top of the crankcase, the pistons and a portion of the connecting rods pass through the holes in the plate. A next step is to insert the pistons with their rings into corresponding bores at the bottom of a selected cylinder block. An important feature of this invention is in the insertion of the pistons and rings into the bores of the extruded block so that the block can be securely attached to the mid-plate and crankcase.

Typically, piston rings have a gap in their circumference so that they can be expanded to fit over the circumference of the piston and into grooves for the rings. The rings extend diametrically outside the pistons to toward the cylinder bores to seal against combustion gas leakage. These rings on each piston must be compressed for assembly, preferably simultaneous assembly, into the corresponding bores of the cylinder block. The top surfaces of the pistons are preferably aligned co-planar for their insertion into the bores of the cylinder block. The cylinder block is positioned upright over the crankcase/piston assembly for vertical insertion of the pistons as the block is lowered. This alignment of the top of each piston and with the bottom surface plane of the block simplifies simultaneous compression of all piston rings and simultaneous piston insertion into the respective bores of the block.

The piston rings are momentarily compressed so that the block may be lowered for insertion of the pistons and rings. Once the pistons and rings are in the respective bores, the compression function is completed and the block is lowered into contact with the upper portion of the crankcase, or mid-plate, ready for attachment to the crankcase and further assembly of the engine.

The compression of the piston rings may be accomplished with a suitable compression fixture with separable elements that are movable from an open position to a closed position. Each fixture element is sized and shaped to engage half the circumference of the ring(s) on each piston. The fixture elements are placed around the pistons to surround and simultaneously compress all the rings. If needed, spacers can be used to position the compression fixture around the pistons in a plane parallel to the plane of the crankcase open top and to space the block above the crankcase. The fixture and spacers used may be modified for mechanized (e.g., robotic) assembly of the engine. In any case, this step temporarily secures and readies the pistons for cylinder block placement.

When the fixture and spacers are used in the assembly they are placed on top of the upright crankcase with the already assembled crankshaft, connecting rods, and pistons. The temporary spacers position the open fixture around the piston rings in the pistons. Preferably, all of the rings are compressed simultaneously when the fixture is closed and the cylinder block is lowered over the fixture so their respective surfaces are generally touching with each cylinder bore aligned concentrically with each piston. The spacers are removed and the fixture and block are lowered together over the pistons. The pistons remain stationary and the fixture slides down the pistons as the pistons slide into the cylinder bores through the bore bottom surface. The piston rings are released as they enter the bores. Lowering continues until the fixture reaches the mid-plate on top of the crankcase. Now the fixture is opened and also removed. Again the cylinder block lowers until it reaches the mid-plate and the pistons slide further up the cylinder bores.

Once the assembly has been completed, the crankcase, cylinder block, and mid-plate can be bolted together for assembly of the engine. It is recognized that various engine components are integrated in the assembly prior to bolting, such as gaskets, but are not described here. Likewise, subsequent components are added to finalize the engine, such as a cylinder head and an oil pump, for installation in an automobile. This method can be implemented as part of the assembly process in an automotive assembly plant.

In a preferred embodiment of this method, very little, if any, inversion is necessary during the process. Traditionally, an engine block is inverted to several orientations to assemble the crankshaft, bearings, connecting rods, and pistons. The module engine architecture provided in the '405 patent allows these components to be pre-assembled and placed through the upright crankcase top, thus obviating the need for any inversion. The simplified process reduces costs and increases assembly speed and efficiency.

These and other objects and advantages of this invention will become apparent from the detailed description of the preferred embodiment that follows.

DESCRIPTION OF A PREFERRED EMBODIMENT

The present invention provides a method assembly of a modular reciprocating piston internal combustion engine of the type described above. This method can be implemented in an assembly line process. The method will be illustrated as applied to an automotive four cylinder in-line engine. Engines of this type are manufactured in large quantities in the automotive industry but this particular application is for illustrative purposes only. As such, it is realized that this method could be used with engines having any number of cylinders and of different configurations, for example a V6 engine. In a V-engine design, it is contemplated that a suitable compression fixture with spacers would be used for each V-leg. Otherwise, the fixtures and spacers would operate and function similar to the method described below. Likewise this method can be adapted to engine architectures other than that exactly described.

The '405 patent describes a modular engine comprising a cast crankcase with an open top and closed bottom, an extruded cylinder bore block, and a mid-plate for sealing the bottom of the cylinder block to the top of the crankcase. The assembly of such an engine requires that a crankshaft, connecting rods, and pistons with piston rings be inserted or assembled in the crankcase and cylinder block as the block and crankcase are brought together. This invention facilitates the assembly of the crankshaft, connecting rods, and pistons.

Figure 1:
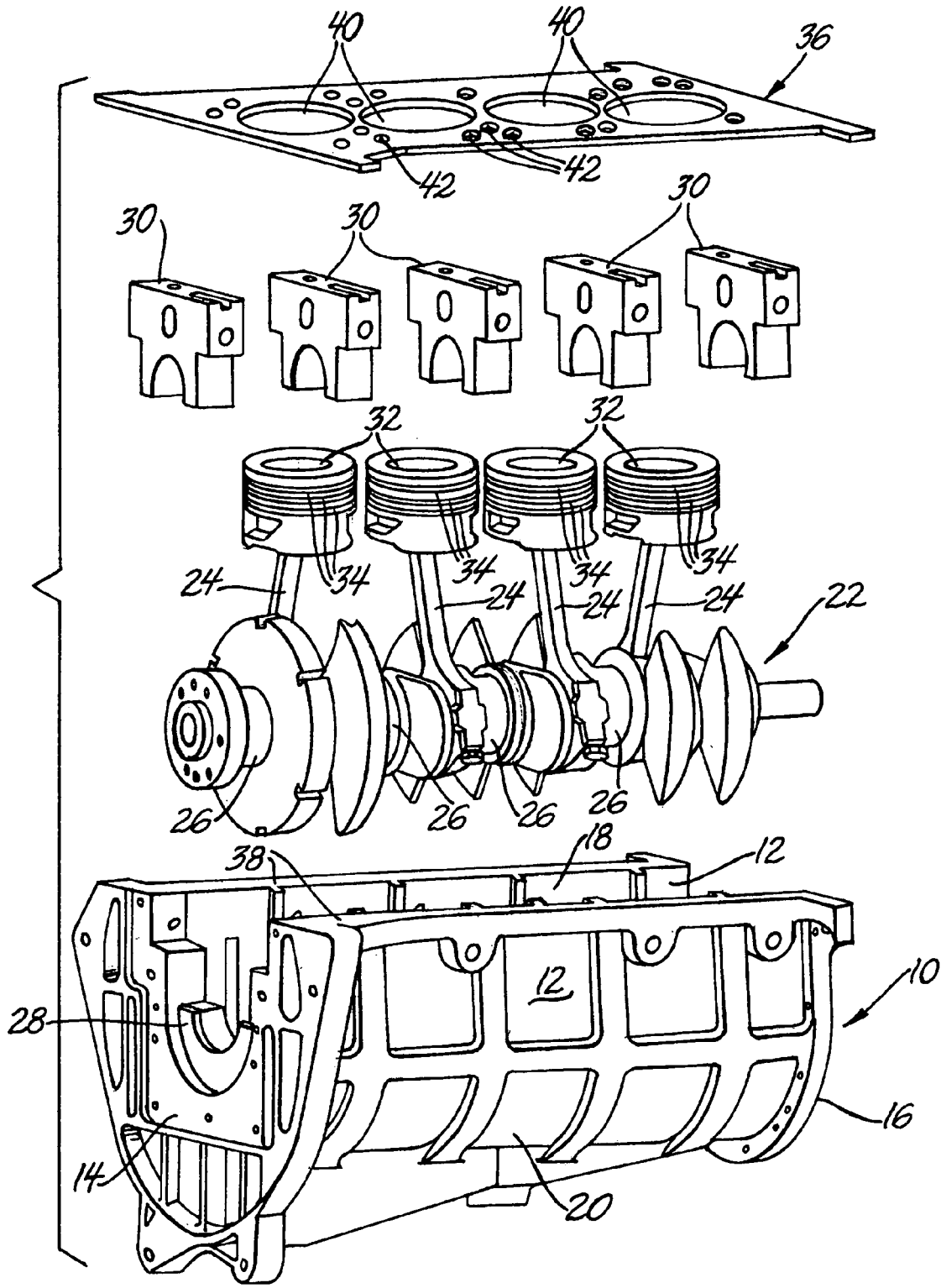
FIG. 1 is an exploded view of a crankcase, pre-assembled crankshaft with connecting rods and pistons, bearing caps, and a mid-plate.

Referring to FIG. 1, a crankcase 10 is a metal casting having side walls 12, end walls 14, 16, an open top 18 and a closed bottom 20. Crankcase 10 is adapted to receive a crankshaft 22 and four connecting rods 24. Crankcase 10 also provides a reservoir for lubricating oil not shown. In an assembled engine, crankshaft 22 is supported for rotation in crankcase 10. Suitably, semi-circular bearing supports are integrally cast into the bottom of crankcase 10 to receive and support journal surfaces 26 of crankshaft 22. One such bearing support is illustrated at 28 at the front end 14 of crankcase 10. Other lower bearing supports are not visible in FIG. 1 but are illustrated in the '405 patent in FIG. 5 (bearing supports 50,52,54,56, and 58) of that patent. The journal surface 26 at the left end of crankshaft 22, as seen in FIG. 1, rests on bearing support 28 when crankshaft 22 is placed in crankcase 10.

Five upper bearing caps 30 will form the upper crankshaft bearing structures. Bearing caps 30 are also semi-circular and complimentary to bearing supports 28. Upper crankshaft bearing caps 30 are bolted to the lower bearing supports 28 after the crankshaft 22 has been placed in crankcase 10. The bearing cap/support sleeves direct oil to the crankshaft journals and secure crankshaft 22 and allow it to rotate during engine operation.

Before crankshaft 22 is placed in crankcase 10, four connecting rods and pistons with piston rings are attached to the crankshaft in a pre-assembly operation. Still referring to FIG. 1, four connecting rods 24 have been attached to crankshaft 22 in a known manner. At their opposite ends, each connecting rod 24 has a piston 32 pivotally attached using a wrist pin or the like. The sides of pistons 32 have circumferential grooves for loosely receiving and retaining piston rings 34. There are typically two or more ductile compression and oil-control piston rings 34 on each piston; three are shown on each piston 32 in FIG. 1. Piston rings 34 have slightly larger diameters than their pistons 32 and the respective cylinder bores and have a gap in their circumference. The gaps are not visible in these drawing figures. The gap provides clearance for compression and expansion of the rings during insertion in the cylinder bores and installation in the piston grooves.

The crankshaft 22, connecting rods 24, and pistons 32 are assembled as shown in FIG. 1 prior to being placed in crankcase 10. This pre-assembly can be accomplished with assembly equipment for such a purpose.

Uppermost in FIG. 1 a flat mid-plate 36 will be used to close open top 18 of crankcase 10 after the crankshaft and connecting rods with pistons have been placed in it. Upper surfaces 38 of the sides 12 and ends 14, 16 of crankcase 10 are machined flat for sealing engagement with mid-plate 36. After the crankshaft 22 with attached connecting rods 24 has been placed in crankcase 10, bearing caps 30 are placed over the journal surfaces 26 of the crankshaft 22.

Figure 2:
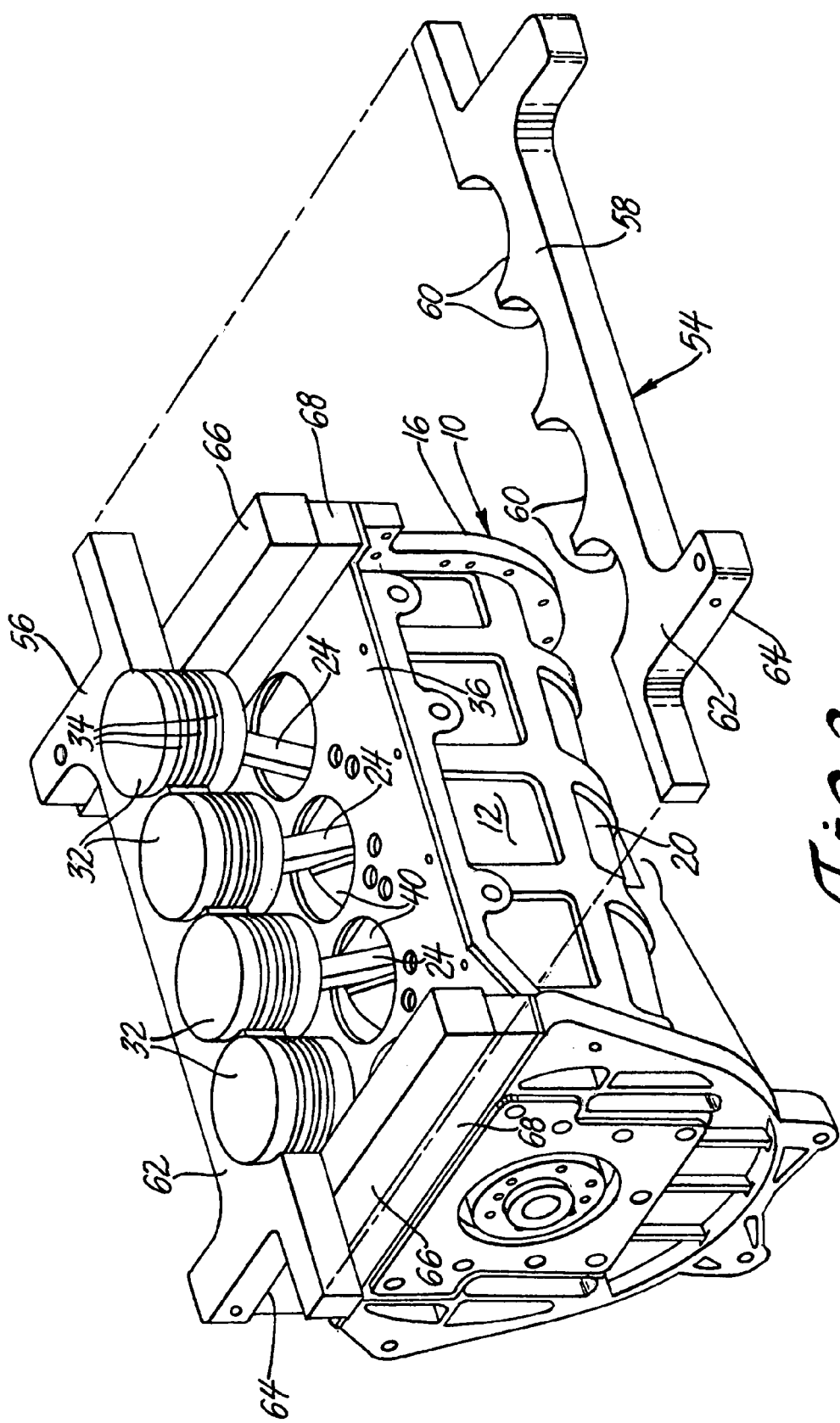
FIG. 2 is an assembled oblique view of the crankcase, pre-assembled components, and mid-plate showing the location of a partially opened piston ring compression fixture together with spacers to accomplish insertion of the pistons and rings in a cylinder block, not shown in this figure.

At this point it may be preferred to place or rotate the crankshaft so that the pistons and connecting rods may be lifted above the crankshaft to about the same height for placement of the mid-plate 36 on the crankcase 10. Mid-plate 36 is placed on top of bearing caps 30 and on top surfaces 38 of the crankcase side and end walls. Mid-plate 36 partially closes open top 18 of crankcase 10 and its enclosed assembled components. Mid-plate 36 is lowered over the upright pistons 32 and connecting rods 24 so that the pistons and rods pass through mid-plate connecting rod holes 40 and the mid-plate lies on the top surfaces 38 of crankcase 10. Depending on the diameter of mid-plate holes 40 as compared with the external diameters of pistons 32 it may be preferred to assemble the piston rings 34 on pistons 32 after mid-plate 36 has been lowered over the pistons 32. Mid-plate holes 40 are sized to allow for the reciprocating motion of connecting rods 24 in the operation of the engine and allow oil to drain from the cylinder block to crankcase 10. Mid-plate bolt holes 42 are spaced properly for bolting of the block to the crankcase 10 and mid-plate 36 as will be described below. See, for example, bolts 82 that are shown in FIG. 2 of the '405 patent when the modular engine is finally bolted together. A gasket, not shown, may be placed between mid-plate 36 and crankcase surfaces 38 and/or between mid-plate 36 and the bottom of the cylinder block 44 shown in FIGS. 3 and 4.

Figure 3:
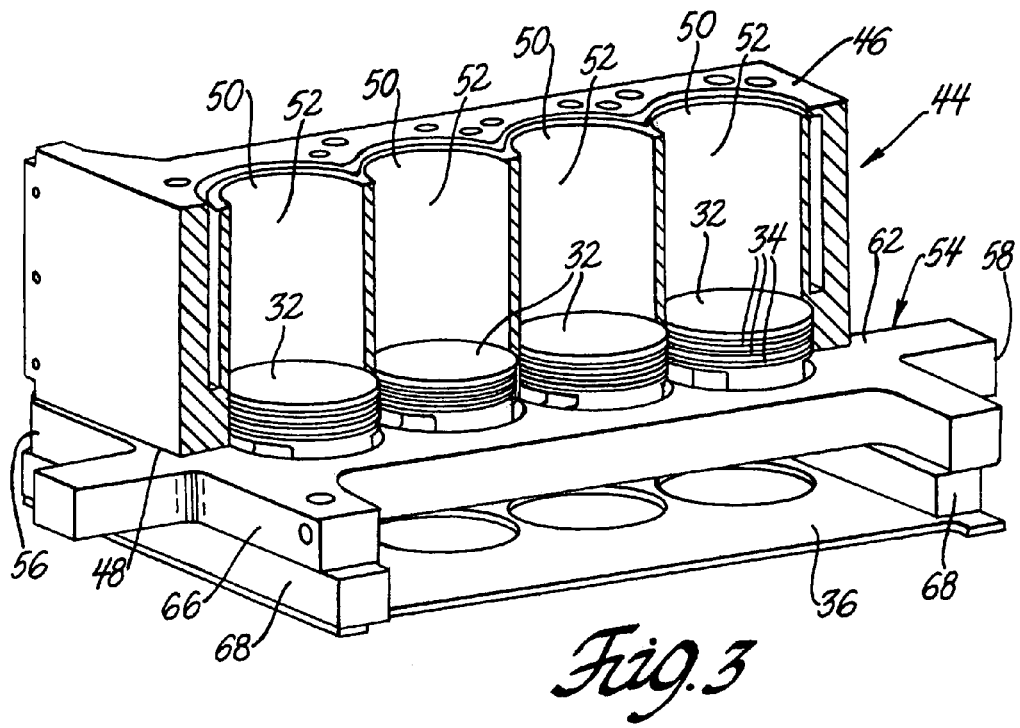
FIG. 3 is a sectional view of a cylinder block where an upper set of underneath spacers have been removed and with the piston ring compression fixture closed with the pistons partially inserted into cylinder bores of the cylinder block. For simplification of the illustration the crankcase is omitted in this view.
Figure 4:
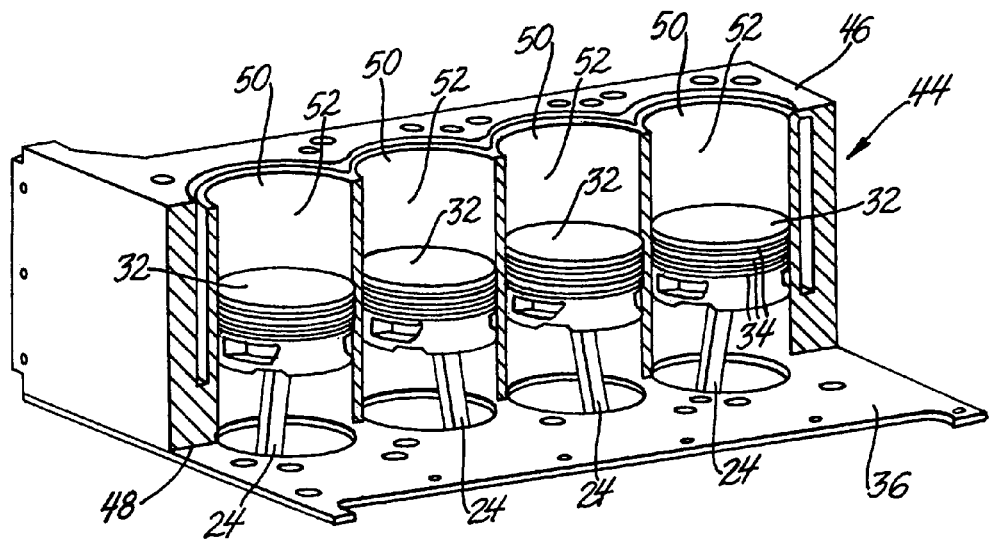
FIG. 4 is a sectional view of the cylinder block of FIG. 3 with a lower set of underneath spacers and the compression fixture both removed so that the pistons are inserted further into the cylinder bores.

FIGS. 3 and 4 of this disclosure show a sectional view of a cylinder bore block 44. Cylinder block 44 is extruded from a suitable aluminum alloy and machined to have a flat top surface 46 and a parallel flat bottom surface 48. Extending through the block 44 from top surface 46 to the bottom surface 48 are four cylinder bores 50 for pistons 32. Bores 50 have cylindrical inner surfaces 52 with slightly larger diameters than pistons 32. A cylinder block like block 44 is shown in more detail as cylinder block 12 in FIGS. 3A and 3B of the '405 patent.

It is now necessary to insert pistons 32 with piston rings 34 in the corresponding bores 50 through the bottom 48 of cylinder block 44. Since the outer diameters of piston rings 34 are slightly greater than the diameters of cylindrical bores 50 the following practice is followed with reference to FIG. 2.

In FIG. 2 the four pistons 32 and the upper ends of connecting rods 24 are seen extending through mid-plate holes 40 and above mid-plate 36. To facilitate insertion of pistons 32 and piston rings 34 into cylinder bores 50, a two-piece piston ring compression fixture 54 is used to compress piston rings 34 so that they can slide into the bores 50. Compression fixture 54 has two complementary sections 56 and 58. Each of the sections 56, 58 has four semi-circular piston ring compression sections 60 for pressing against piston rings 34. In FIG. 2, the complementary sections 56, 58 of compression fixture 54 are shown pulled apart for illustrative purposes. One section 56 is shown in the closed position of compression fixture 54, lying against the piston rings 34. The other section 58 is shown in the open position of compression fixture 54.

Fixture 54 can be machined from hard steel. Preferably, the fixture is equally divided along a central axis to form the right and left hand compression sections 56 and 58. When separated, and in an open position, sections 56, 58 are mirror images of each other with half circular compression sections 60 formed in the divided axis each shaped complimentary to one half of a piston 32. Compression sections 56, 58 have flat top surfaces 62 and flat bottom surfaces 64. The thickness of compression sections 56, 58 between surfaces 62 and 64 is sufficient to cover piston rings 34 as they may be spaced on the circumference of pistons 32 so that all piston rings 34 may be compressed at the same time for the insertion of pistons 32 into bores 50. The movement of compression sections 56, 58 between their open and closed positions may be accomplished by hand or mechanically.

It will be realized that cylinder block 44 must be moved carefully toward pistons 32 and crankcase 10 to further the assembly of these engine components. Preferably the cylinder block is carried by a suitable hoist or support means, not shown, and lowered over the pistons 32 with their compressed rings 34. The spacing and orientation of the block and the upper surface of crankcase 10 is important in this phase of the process. When the assembly is done, for example, by hand a set of spacer blocks may be used to control the lowering of the cylinder block. Thus, in FIG. 2 an upper set of two spacer blocks 66 and a lower set of two spacer blocks 68 are placed on top of mid-plate 36 and underneath piston ring compression fixture 54. Lower spacer blocks 68 and upper spacer blocks 66 cooperate with piston ring compression fixture 54 to support and locate pistons 32 for their insertion through the bottom surface 48 of cylinder block 44 into bores 50. The spacers are suitable for low volume engine assembly operations. But it is contemplated that in a continual engine assembly operation the movement of the cylinder block 44 can be mechanically and numerically controlled to perform the function of the spacers in moving the block. In this illustrative example, however, each spacer block set 66, 68 set includes two similarly shaped rectangular pieces positioned underneath opposite ends of piston ring compression fixture 54.

An embodiment of the method of engine assembly will now be described in order. Crankcase 10 of FIG. 1 is positioned and stabilized in its upright operating orientation by any suitable means so that its flat top surfaces 38 lie a horizontal plane. The crankshaft/connecting rod/pistons pre-assembly components are then placed in crankcase 10 through open top 18 as described and generally illustrated in FIG. 1. Each journal 26 of crankshaft 22 is placed in each respective bearing support 28. Journal 26 rests on end bearing support 28 where the crankshaft end will protrude out of this crankcase end for attachment with a flywheel. Next bearing caps 30 are placed over crankshaft journals 26 and over each complimentary bearing support 28 to form the bearing structure sleeves at each journal. Ultimately, bearing caps 30 are bolted down to secure crankshaft 22 and connecting rods 24 in crankcase 10. The bearing cap top surfaces are flush with crankcase top surfaces 38 to form the same horizontal plane. Shown better in FIG. 2, when secured, connecting rods 24 and pistons 32 each extend partially above the horizontal plane formed by crankcase top 38. Mid-plate 36 is then placed over the crankcase top 38 and bearing caps 30 to partially close the crankcase compartment. Mid-plate holes 40 allow clearance for pistons 32 when the mid-plate 36 is placed on the crankcase 10. At this point, if needed, crankshaft 22 is rotated until the piston top surfaces are aligned in a generally co-planar configuration. This is for placing the fixture around the piston rings and later for inserting the pistons in the cylinder bores.

Once such crankcase assembly is accomplished, the cylinder block placement process begins. Still referring to FIG. 2, spacer sets 66, 68 are first placed on top of mid-plate 36. The rectangular pieces of each set are positioned temporarily on opposite edges of mid-plate 36 as shown. The spacers provide a horizontal resting plane for piston ring compression fixture 54 that is parallel to the crankcase top surface plane 38: The spacers also provide the appropriate vertical height for compression fixture 54 so that compression sections 60 will overlap piston rings 34 and the compression fixture 54 top surface 62 is generally flush with the co-planar piston top surfaces.

Compression fixture 54 is now closed around each piston 32 to compress all piston rings 34 closer into their ring grooves and to form a slip-fit. Compression fixture 54 may be closed by hand and bolted or clamped or located and closed by robot arms or the like. Compression fixture 54 is carefully located on top of spacers 66, 68 so as to lie in a plane parallel to the plane of the crankcase top surfaces 38. The closed compression fixture 54 locates pistons 32 and compresses rings 34 for insertion into bores 50 of cylinder block 44.

Cylinder block 44 is lowered over stabilized crankcase 10 with the described assembled components and closed compression fixture 54. Bores 50 are aligned with the corresponding pistons 32 and block 44 is lowered flat bottom surface 48 first toward pistons 32. Each cylinder bore 50 is aligned axially and concentrically with a piston 32. Block 44 is lowered until bottom surface 48 touches top surface 62 of compression fixture 54. Block 44 and crankcase 10 are vertically offset by spacers 66, 68 and compression fixture 54. With the assembly thus carefully aligned, one set of spacer blocks are removed so that the cylinder block 44 can move toward the crankcase upper surfaces 38 and receive the compressed piston rings 34 into bores 50.

FIGS. 3 and 4 illustrate the next steps of this process. In both Figures, cylinder block 44 is sectioned to show the piston 32/bore 50 relationship. In FIG. 3, following the removal of upper spacers 66, cylinder block 44 has been lowered to receive the upper ends of pistons 32 and all of rings 34. Compression fixture 54 has been pushed downwardly against lower spacer blocks 68. The pistons, however, do not move with the fixture or blocks. Instead, pistons 32 remain stationary as compression fixture 54 slides down and cylinder block 44 slides over the pistons 32. The slip-fits once formed between piston rings 34 and the compression sections 60 of compression fixture 54 no longer exist as the pistons 32 and rings 34 slide into cylinder bores 50. Rings 34 expand slightly as they are simultaneously received through the bottom surface 48 of block 44 and into sliding contact with bore inner surfaces 52. The process is delicate to ensure that the surfaces involved—crankcase top surface, co-planar top piston surfaces, and cylinder block bottom surface—form parallel planes throughout. The block's bottom surface and the fixture's upper surface remain generally touching so the block and fixture are lowered together. FIG. 3 shows the new configuration after upper spacer set 66 is removed.

After the pistons have been initially inserted into the cylinder bores, the remaining spacer set 68 and piston ring compression fixture 54 are removed. When this is done the pistons 32 will be inserted further into the cylinder bores 50 as shown in FIG. 4. Again, spacer set 68 is carefully removed. Fixture 54 and block 44 are lowered together to fill the vertical space no longer occupied by set 68. The two are lowered uniformly in the same relationship as when set 66 was removed. Pistons 32 are still stationary and piston rings 34 slide up bore inner surfaces 52 with the pistons 32. The fixture and block are lowered close to, but not touching, mid-plate 36. Finally, compression fixture 54 is open and/or removed. The parts are completely pulled apart and block 44 is lowered until bottom surface 48 contacts mid-plate 36. Block 44, mid-plate 36, and crankcase 10 are now all positioned for bolting attachment.

Thus it is observed that compression fixture 54 is used to temporarily secure, align, and compress pistons 32 with piston rings 34 in the pre-assembled crankshaft assembly for insertion in cylinder block 44. As described, the modular engine components remain in an upright position throughout the process but this is only a preferred embodiment and thus the components could be stabilized in various positions throughout the assembly process without departing from the scope of the invention. Furthermore it is contemplated that this method would be implemented in a mass production assembly line process. Inherent in this implementation are automated and robotic modifications for virtually every step of the described assembly process that are all intended to come within the scope of the invention.

While the invention has been described in terms of a preferred embodiment, it is not intended to be limited to that description, but rather only to the extent of the following claims.

The invention claimed is:

1. A method of assembling an internal combustion engine, said engine comprising a crankcase having an open top and a closed bottom for receiving a crankshaft, a crankshaft, a plurality of connecting rods and pistons with piston rings, and an extruded cylinder block with a cylinder bore for each of said pistons, said bores extending from a top surface to a bottom surface of the block, said method comprising the steps of:

placing an assembly comprising said crankshaft, connecting rods and pistons into said crankcase through said open top of said crankcase, said pistons and a portion of said connecting rods extending out of the open top of said crankcase;

compressing said piston rings on each of said pistons to fit into bores in said cylinder block;

inserting said pistons into said block so that they enter the corresponding bores at said bottom surface of said block while releasing the compression of said rings as they are received into each respective bore; and attaching said crankcase to said block.

2. A method as recited in claim 1 further comprising the step of:

lowering said block over said pistons so that its bottom surface lies in a plane parallel to a plane formed by said open top surface of said crankcase.

3. A method as recited in claim 2 wherein during said lowering step, each of said pistons are coaxial with said corresponding bores.

4. A method as recited in claim 1 further comprising the step of:

aligning said plurality of pistons so that their respective top surfaces are generally co-planar and parallel to a plane formed by said block bottom surface so said pistons simultaneously enter said cylinder bores through said bottom surface.

5. A method as recited in claim 1 wherein said compressing step further includes using separable semi-circular piston ring compression fixture elements to enclose and simultaneously compress all of said piston rings.

6. A method as recited in claim 5 wherein said fixture elements are spaced above said crankcase around said pistons in a plane parallel to a plane formed by said open top surface of said crankcase.

7. A method as recited in claim 1 wherein said engine further comprises a mid-plate, and said mid-plate is placed over said open top of said crankcase with holes for said extending connecting rods.

8. A method of assembling an internal combustion engine using a piston ring compression fixture, said engine comprising a crankcase having an open top for receiving a crankshaft and a closed bottom, a crankshaft with a plurality of attached connecting rods, said connecting rods having attached pistons with piston rings, and an extruded cylinder block with a flat bottom surface and flat top surface with a cylinder bore for each of said pistons extending through the block from said top to said bottom surfaces, said method comprising the steps of:

positioning said crankcase with its open top upright to receive said crankshaft with attached connecting rods and pistons through said open top, said open top being generally flat and defining a plane;

placing said crankshaft through said open top to rest on said closed bottom of said crankcase with said pistons and piston rings and a portion of said connecting rods extending above said open top;

locating said pistons and rings at a common level above the plane of said open top of said crankcase;

simultaneously compressing all of said piston rings with said compression fixture;

locating said cylinder block over said fixture with said cylinder bores each aligned with a piston whereby said flat bottom of said block lies in a plane parallel to said crankcase open top plane;

inserting said pistons with the compressed rings into the bores of said block;

removing said compression fixture; and lowering said block with said inserted pistons for attachment to said crankcase.

9. A method of inserting a plurality of pistons with piston rings in an extruded cylinder block, said pistons having co-planar top surfaces and said block having a flat bottom surface with a cylinder bore therein for each of said pistons, said method comprising the steps of:

simultaneously compressing said piston rings on all of said pistons to fit into said cylinder bores;

placing said block with respect to said pistons so that its bottom surface is in a plane parallel to said co-planar piston top surfaces; and inserting said pistons through said bottom surface into said cylinder bores with said pistons rings being released from said compression as the rings enter said bores.

\* \* \* \* \*